(12) United States Patent
Sykes et al.

(10) Patent No.: US 10,117,425 B2
(45) Date of Patent: Nov. 6, 2018

(54) TROLLING DIVER

(71) Applicants: Christine N. Sykes, Rochester, NY (US); John R. Sykes, Rochester, NY (US)

(72) Inventors: Christine N. Sykes, Rochester, NY (US); John R. Sykes, Rochester, NY (US)

( * ) Notice: Subject to any disclaimer, the term of this patent is extended or adjusted under 35 U.S.C. 154(b) by 152 days.

(21) Appl. No.: 15/269,352

(22) Filed: Sep. 19, 2016

(65) Prior Publication Data
US 2017/0112114 A1 Apr. 27, 2017

Related U.S. Application Data

(60) Provisional application No. 62/245,112, filed on Oct. 22, 2015.

(51) Int. Cl.
*A01K 91/08* (2006.01)

(52) U.S. Cl.
CPC .................... *A01K 91/08* (2013.01)

(58) Field of Classification Search
CPC ...................................................... A01K 91/08
USPC ................... 43/43.13, 43.12, 42.22
See application file for complete search history.

(56) References Cited

U.S. PATENT DOCUMENTS

| | | | | |
|---|---|---|---|---|
| 2,062,718 A * | 12/1936 | Kallberg | ................ | A01K 91/08 43/43.13 |
| 2,273,209 A * | 2/1942 | Louthan | ................. | A01K 91/08 43/43.13 |
| 2,726,475 A * | 12/1955 | Wiselka | ................ | A01K 91/08 43/42.23 |
| 2,924,907 A * | 2/1960 | Hamilton | ............... | A01K 91/08 43/42.22 |
| 3,269,051 A * | 8/1966 | Saunders, Jr. | ......... | A01K 95/00 43/43.12 |
| 3,583,089 A * | 6/1971 | Scarbro | ................... | A01K 91/08 43/42.04 |
| 3,643,370 A * | 2/1972 | Cook | ..................... | A01K 95/00 43/43.12 |
| 3,755,955 A * | 9/1973 | Saia | ....................... | A01K 91/08 43/42.04 |
| 3,808,727 A * | 5/1974 | Flanders | ................ | A01K 91/08 43/43.13 |
| 3,816,954 A * | 6/1974 | Bissonette | ............. | A01K 91/08 43/43.12 |
| 3,835,573 A * | 9/1974 | Borchardt | ............. | A01K 91/08 43/43.12 |

(Continued)

*Primary Examiner* — Darren W Ark

(57) ABSTRACT

A trolling diver has a release arm which is hingedly connected to a plate. Mounted to the plate is a catch assembly. The catch assembly secures the release arm in a loose manner, between a first panel and a second panel, until triggered by a fish bite. A thru-hole of the release arm receives a first and second retaining member. The retaining members are loosely positioned into the thru-hole, allowing for the plate to realistically flop about within the catch assembly. The release arm is released from the catch assembly when a lure is triggered by a fish strike, resulting in the release arm rotating away from the catch assembly. The outboard lure attachment hole increases leverage and decreases the requisite force to trigger the release arm. Once released, the entire diver pulls thru the water with very little friction, allowing for easy retrieval of a hooked fish.

2 Claims, 12 Drawing Sheets

(56) References Cited

U.S. PATENT DOCUMENTS

| | | | | |
|---|---|---|---|---|
| 3,839,813 A * | 10/1974 | DeSmidt | A01K 91/08 43/43.12 |
| 3,844,059 A * | 10/1974 | Weber | A01K 95/00 43/43.13 |
| 3,879,884 A * | 4/1975 | Tucker, Sr. | A01K 91/08 43/43.12 |
| 3,897,647 A * | 8/1975 | Black | A01K 85/00 43/43.12 |
| 3,905,148 A * | 9/1975 | Naone | A01K 91/08 43/43.12 |
| 3,930,330 A * | 1/1976 | Black | A01K 91/08 43/43.12 |
| 3,940,872 A * | 3/1976 | Weber | A01K 91/08 43/43.13 |
| 3,974,589 A * | 8/1976 | Henze | A01K 91/08 24/115 F |
| 4,125,958 A * | 11/1978 | Cote | A01K 91/04 43/43.12 |
| 4,282,672 A * | 8/1981 | Neary | A01K 91/08 43/43.13 |
| 4,453,336 A * | 6/1984 | Lowden | A01K 91/08 43/43.12 |
| 4,486,970 A * | 12/1984 | Larson | A01K 91/08 43/43.13 |
| 4,567,687 A * | 2/1986 | Even | A01K 95/00 43/43.13 |
| 4,876,820 A * | 10/1989 | Vann | A01K 91/08 43/43.13 |
| 5,255,467 A * | 10/1993 | Haskell | A01K 91/08 43/42.22 |
| 5,339,561 A * | 8/1994 | Weber | A01K 91/08 43/43.13 |
| 6,016,622 A * | 1/2000 | Even | A01K 91/08 43/43.13 |
| 7,520,088 B2 * | 4/2009 | Even | A01K 91/08 43/43.13 |
| 7,637,051 B2 * | 12/2009 | Emory | A01K 91/08 43/43.13 |
| 7,703,235 B2 * | 4/2010 | Ford | A01K 91/08 43/42.22 |
| 7,984,582 B2 * | 7/2011 | Brinker | A01K 91/08 43/43.12 |
| 8,776,429 B2 * | 7/2014 | Ford | A01K 91/08 43/42.23 |
| 2004/0244270 A1 * | 12/2004 | Brinker | A01K 91/08 43/43.13 |
| 2006/0260181 A1 * | 11/2006 | Enos | A01K 91/08 43/43.13 |
| 2011/0252691 A1 * | 10/2011 | Heyne | A01K 91/08 43/43.13 |

\* cited by examiner

TROLLING DIVER

The current application claims a priority to the U.S. Provisional patent application Ser. No. 62/245,112 filed on Oct. 22, 2015.

FIELD OF THE INVENTION

The present invention relates generally to a fishing apparatus which allows for a deeper presentation of the bait while trolling, without the use of a downrigger device. It also better imitates natural bait movements and is easily adjustable for multi-directional control and depths.

BACKGROUND OF THE INVENTION

A variety of trolling divers are available to fishers. There are many differences between these divers, including construction, release mechanisms, and trolling depths capability. The present invention is a trolling diver that offers improvements in several key areas. Most notably, the present invention secures a lure arm to a catch assembly in a manner that allows for small movements of the release arm within the catch assembly. This allows the release arm to flop around, helping to allow the main body of the device to act as a flasher to catch the fishes attention and move the lure more realistically thru the water. To enhance the attention grabbing properties, flash tape may be applied to the diver to improve the functionality as bait.

The present invention also introduces an outboard fin, positioned outside the radius of the rest of the trolling diver body. The increased distance from the center of the trolling diver increases leverage and allows for a clean release on lighter fish strikes. Also used, is stainless steel material for both the release arm and catch assembly, which is unaffected by water temperature changes for release tension adjustments, something that plagues the molded plastic catch release of the other devices in the marketplace.

Another improvement is a positive lock weight system, which affects lean in the diver body to adjustably control its left or right tracking compared to the boat within the water. A preferred embodiment of the present invention, which is an improvement over other divers in the marketplace, those being made of plastic are prone to the weight system shifting unexpectedly in use due to fatigue of its plastic locking mechanisms. This, along with potential alternative configurations and components, are hereafter described.

DETAIL DESCRIPTIONS OF THE INVENTION

All illustrations of the drawings are for the purpose of describing selected versions of the present invention and are not intended to limit the scope of the present invention.

Figure 7:
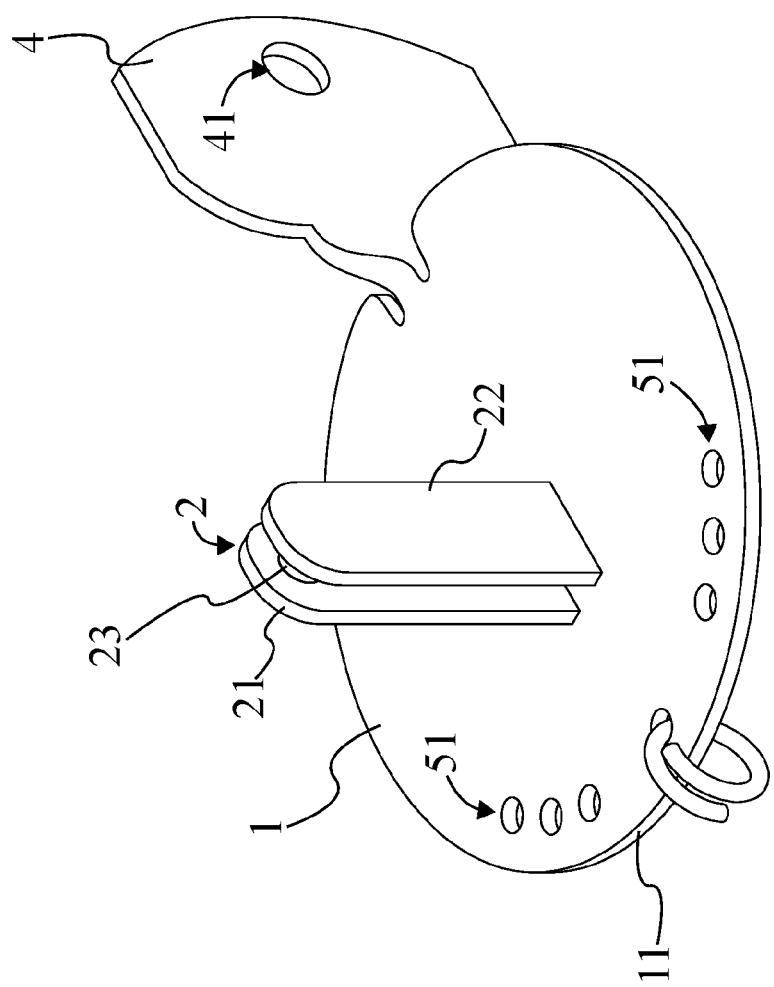
FIG. 7 is a perspective view showing a plate, catch assembly, and fin of the present invention.
Figure 8:
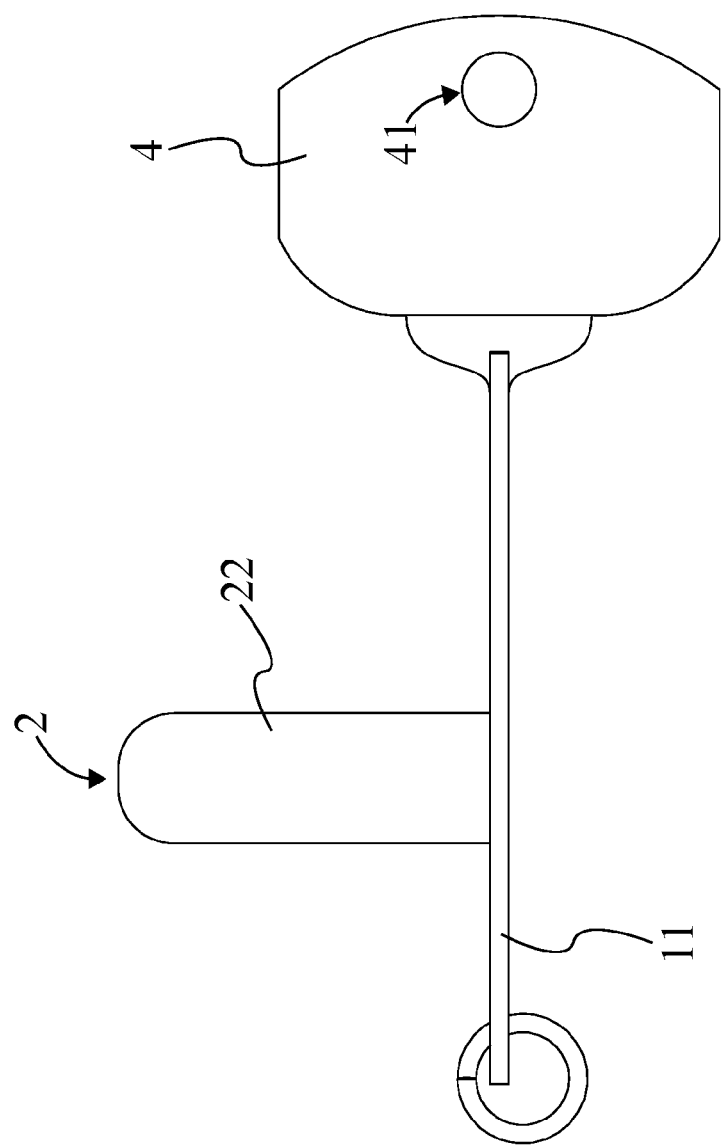
FIG. 8 is a side view thereof.
Figure 9:
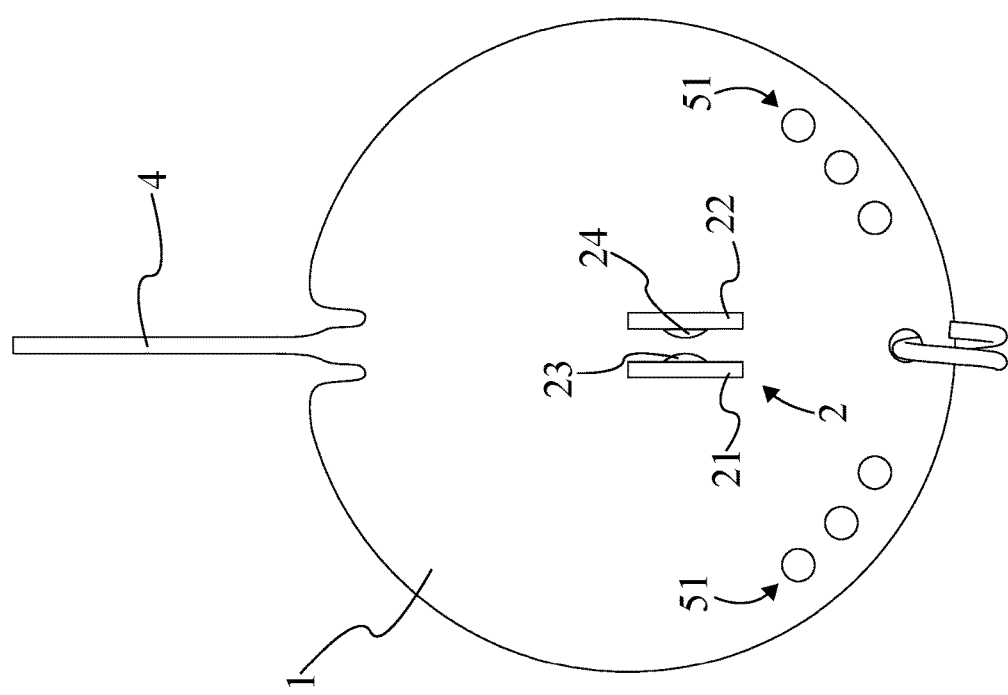
FIG. 9 is a top view thereof.
Figure 10:
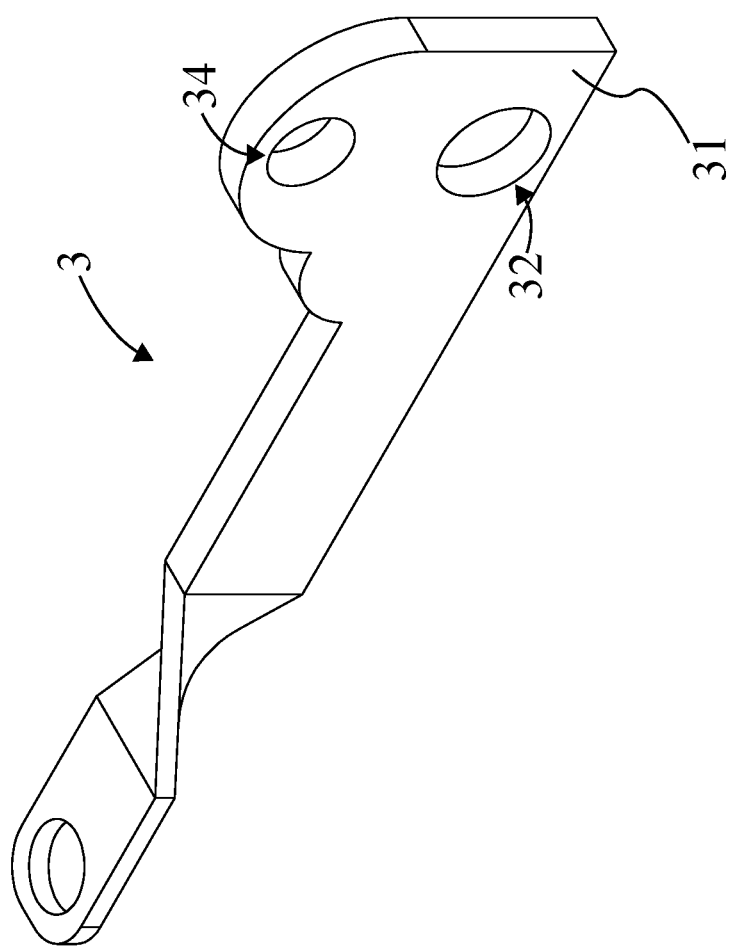
FIG. 10 is a perspective view showing the release arm of the present invention.
Figure 11:
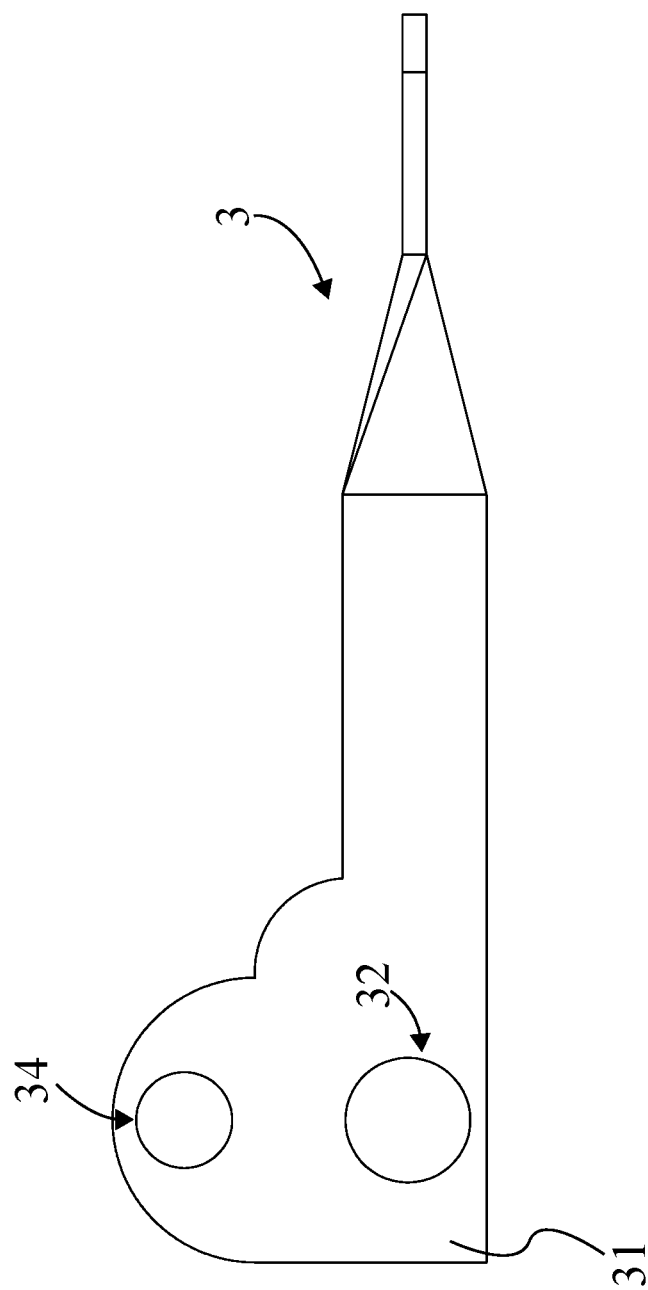
FIG. 11 is a side view thereof.
Figure 12:
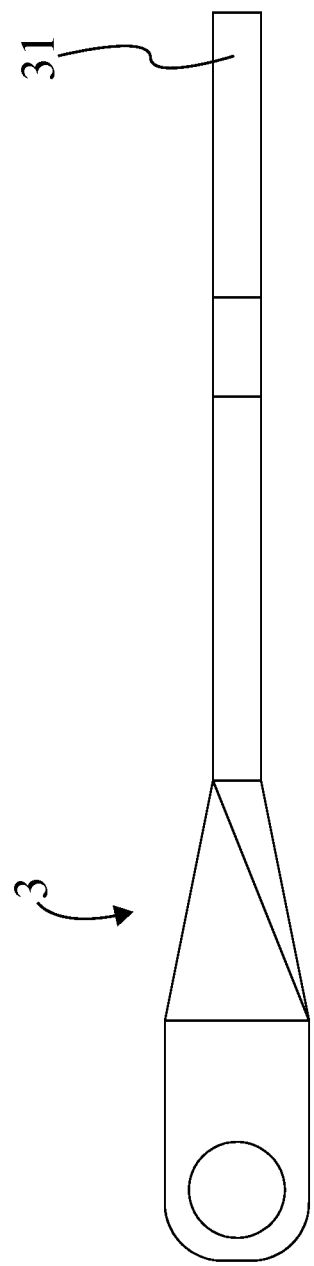
FIG. 12 is a top view thereof.

The present invention is an improved trolling diver. The components and configuration of the present invention serve to artificially "pull" the lure quickly down to trolling depths and move both diver and lure off center of boat, and also provide a more realistic movement of lures and added attraction when fishing. The present invention comprises a plate 1, a catch assembly 2, a release arm 3, and a fin 4. The plate 1 serves as a support for the other components while also allowing for the present invention to artificially pull downward and travel smoothly through water. The catch assembly 2 secures the release arm 3 until triggered by a fish biting the lure, the lure being joined to the fin 4. The fin 4, along with the plate 1, enables smooth, directionally-controlled movement of the present invention. The release arm 3 is hingedly connected to the plate 1, allowing it to release from the catch assembly 2 when triggered by a fish. The release arm 3 receives a line from a boat, as later described. The present invention is fully illustrated in FIG. 1-FIG. 6 while the plate 1, catch assembly 2, and fin 4 are independently illustrated in FIG. 7-FIG. 9 and the release arm 3 is independently illustrated in FIG. 10-FIG. 12.

The plate 1 itself comprises a lateral surface 11. The catch assembly 2 comprises a first panel 21, a second panel 22, a first retaining member 23, and a second retaining member 24. The release arm 3 comprises a free end 31 and a thru-hole 32. The first panel 21 and second panel 22 are positioned adjacent to each other, through a top surface of the plate 1. The space between the first panel 21 and the second panel 22 allows for the release arm 3 to slide between the two panels for latching purposes. Preferably, the first panel 21 and the second panel 22 are parallel with each other. The parallel setup allows for a smooth fit of the release arm 3 between the two panels.

The catch assembly 2 functions to pinch the release arm 3 between the first panel 21 and the second panel 22. Said pinching is created by the first retaining member 23 and second retaining member 24 pushing into the thru-hole 32 of the release arm 3. The "pinching" can be tightened or loosened via an adjustment fastener 6, as later described. By controlling the amount of pinch and taking advantage of the "springiness" of the catch assembly 2, a more controlled release is provided for when a fish pulls on a lure connected to the fin 4.

The retaining members interface with the thru-hole 32 of the release arm 3 in order to secure the release arm 3 between the first panel 21 and the second panel 22. More specifically, the first retaining member 23 is mounted to the first panel 21. Mirroring this, the second retaining member 24 is mounted to the second panel 22. To allow for the retaining members to secure the release arm 3, each retaining member is positioned between the first panel 21 and the second panel 22. In short, the retaining members are positioned on the interior faces of their respective panels. As shown in the illustrated figures, the retaining members are convex protrusions of the panels. In simpler terms, each retaining member is a bump. This shape allows for an ideal engagement with the thru-hole 32, as later detailed.

Corresponding to the first retaining member 23 and the second retaining member 24 is the thru-hole 32. The thru-hole 32 is formed at the free end 31 of the release arm 3. The other end of the release arm 3 is a fixed end, where the release arm 3 is hingedly connected to the plate 1. The resulting hole is able to receive an aligned retaining member the two panels.

When the release arm 3 is rotated so that the free end 31 is positioned between the first panel 21 and the second panel 22, the first retaining member 23 presses into the thru-hole 32. Likewise, the second retaining member 24 presses into the thru-hole 32. Resultantly, the release arm 3 is engaged with the catch assembly 2. It is noted that the release arm 3 is not fully locked within the catch assembly 2. Rather, there is an amount of play between the release arm 3 and the catch assembly 2. This means the release arm 3 is capable of slight movement within the catch assembly 2. This movement helps to create more realistic fish-like movement of the present invention through water. This is advantageous compared to embodiments that employ a more rigid coupling between the release arm 3 and catch assembly 2. A rigid coupling does not allow for play, as earlier referenced. Such a rigid coupling thus results in a less effective bait.

The release arm 3 is shown as being joined to the plate 1 by a ring, which is engaged with a hole in the plate 1. Other means of joining the release arm 3 to the plate may be used, as long as they allow for both of the following: engagement between the release arm 3 and the catch assembly 2, as well as rotation of the release arm 3 relative to the plate 1.

Returning to the general components of the present invention, the fin 4 is connected to a rear end of the plate 1. The fin's 4 position is opposite the hinged end of the release arm 3, around the lateral surface 11 of the plate 1. The leading edge of the fin 4 is angled away from the plate 1, as can be seen in the accompanying figures. The fin itself 4 is adjacently connected to the plate. This offset, or "outboard", positioning of the fin 4 provides several advantages. Namely, the outboard positioning allows for more leverage between a connected line and the plate 1. As a result, less force (for example, from a fish strike) is required to release the release arm 3 from the catch assembly 2.

As shown in FIG. 1, FIG. 3, FIG. 4, and FIG. 6, the present invention further comprises a plurality of alignment holes 51, a weight 52, and a fastener 53. These components allow a user to shift the balance of the present invention. The plurality of alignment holes 51 is positioned at the front of the plate 1, along a perimeter of the plate 1. The weight 52 is positioned below the plate 1, adjacent to one of the plurality of alignment holes 51. The fastener 53 secures the weight 52 to the plate 1. These components combine to enable different amounts of tilt. Resultantly, the present invention can be used with multiple port and starboard trolling positions, accomplished through simple adjustments of the weight 52.

The plurality of alignment holes 51 serves to provide several possible weight distributions via movement of the weight 52. Supporting a user's desired weight distribution, the weight 52 is positioned adjacent to a selected alignment hole 54 from the plurality of alignment holes 51. The weight 52 is fixed in place by the fastener 53. As such, the fastener 53 traverses through the selected alignment hole 54 into the weight 52.

The configuration of the alignment holes 51, the weight 52, and the fastener 53 facilitates easy weight redistribution. A user is able to move the weight 52 between alignment holes 51, or even remove the weight 52 altogether. To disengage the weight 52 from a selected alignment hole 54, a user simply removes the fastener 53 from the weight 52. The weight 52 is then placed adjacent to a newly selected alignment hole 54, at which point the fastener 53 is inserted through the newly selected alignment hole 54 and into the weight 52. The fastener 53 is shown as a screw in the illustrated embodiment, but in alternative embodiments different types of fasteners 53 may be utilized.

Returning to the catch assembly 2, it is preferable to provide a means of adjusting the tightness between the catch assembly 2 and the release arm 3. To support this, the present invention further comprises a tension-adjusting member 6. The tension-adjusting member 6 laterally traverses through the first panel 21 and the second panel 22. Manipulation of the tension-adjusting member 6 enables a user to adjust the spacing between the first panel 21 and the second panel 22. Tightening the tension-adjusting member 6 pulls the first panel 21 and the second panel 22 closer together. Conversely, loosening the tension-adjusting member 6 increases the distance between the first panel 21 and the second panel 22. Tightening and loosening of the tension-adjusting member 6 effectively controls the amount of play between the catch assembly 2 and the release arm 3.

As shown in the illustrated embodiment, the tension-adjusting member 6 is of a screw type, being threadibly engaged with the first panel 21 and the second panel 22. A threaded engagement is ideal as a user can manipulate the tension-adjusting member 6 by hand. Other types of engagements can be utilized between the tension-adjusting member 6 and the two panels; however, the most ideal choices will allow for tool-free manipulation.

It is also preferable for the tension-adjusting member 6 to be positioned adjacent to the plate 1, at the bottom portion of the two panels. This is ideal as it does not interfere with movement of the release arm 3; if the tension-adjusting member 6 was positioned at the top of the panels, it could prevent the release arm 3 from being secured by the catch assembly 2.

Figure 1:
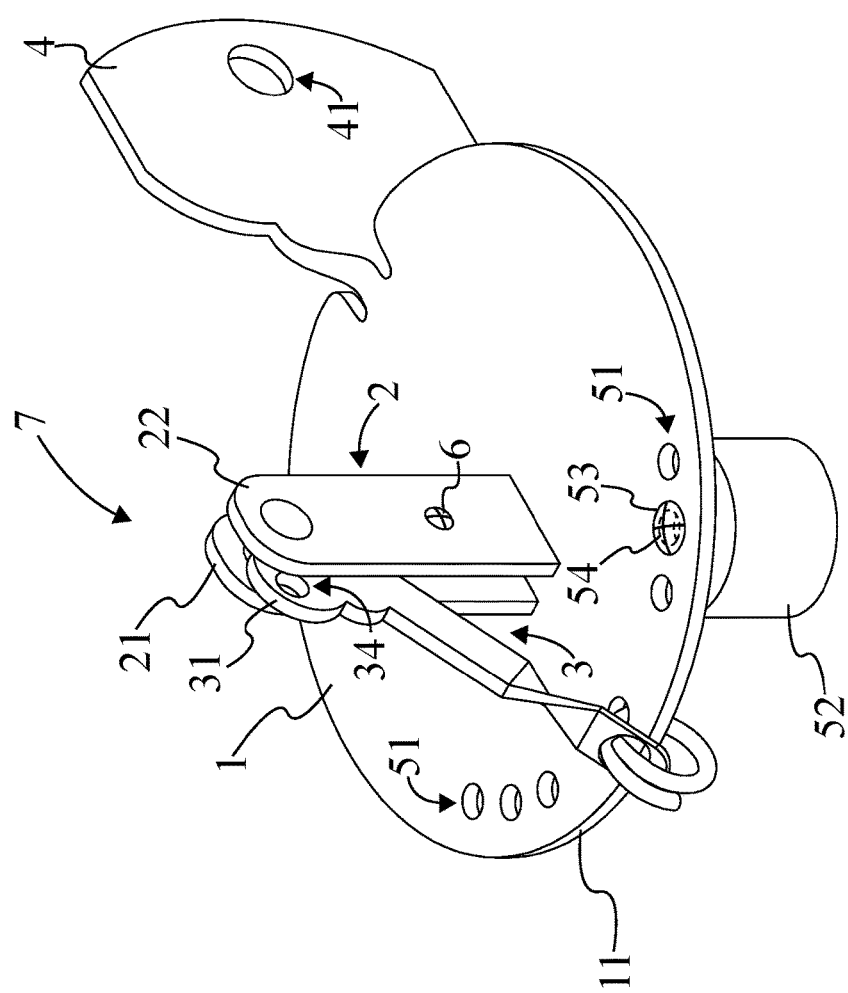
FIG. 1 is a perspective view showing the present invention with a release arm secured to a catch/body assembly.
Figure 2:
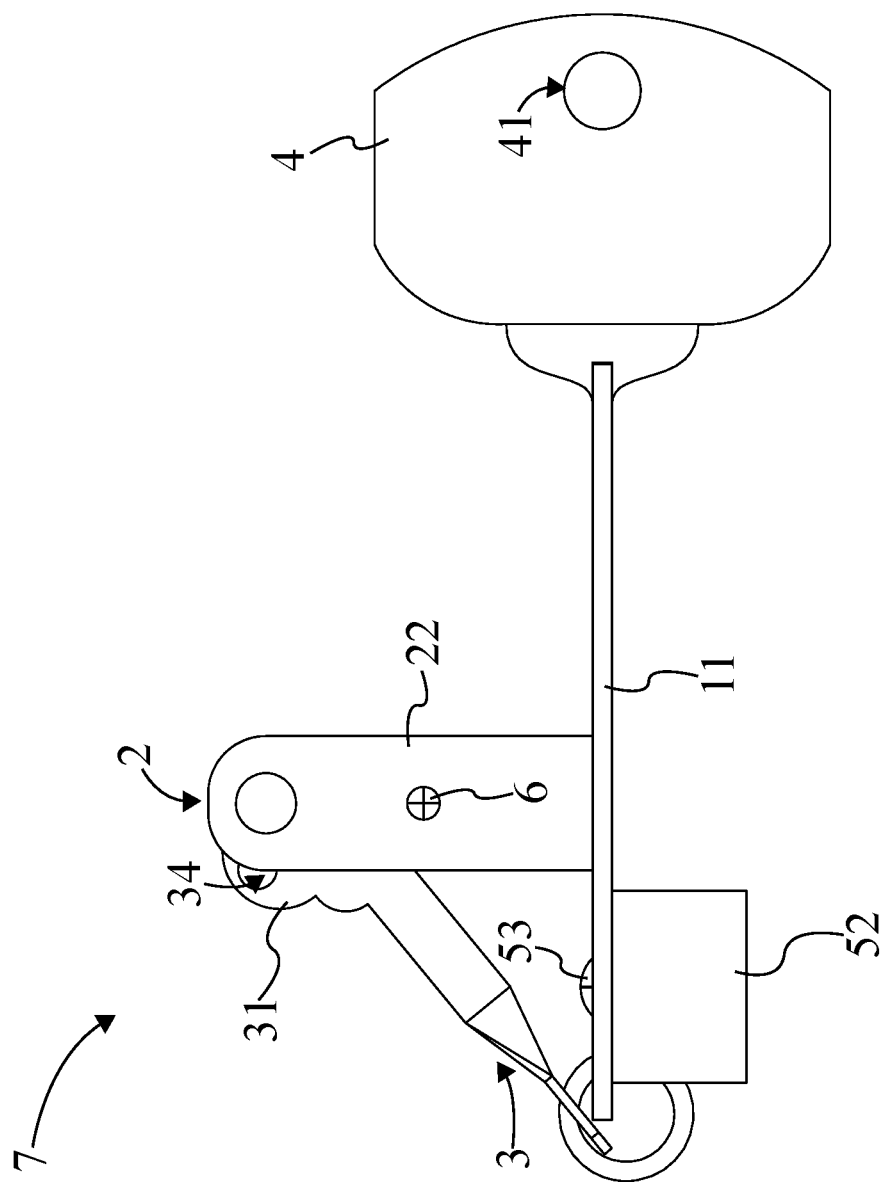
FIG. 2 is a side view thereof.
Figure 3:
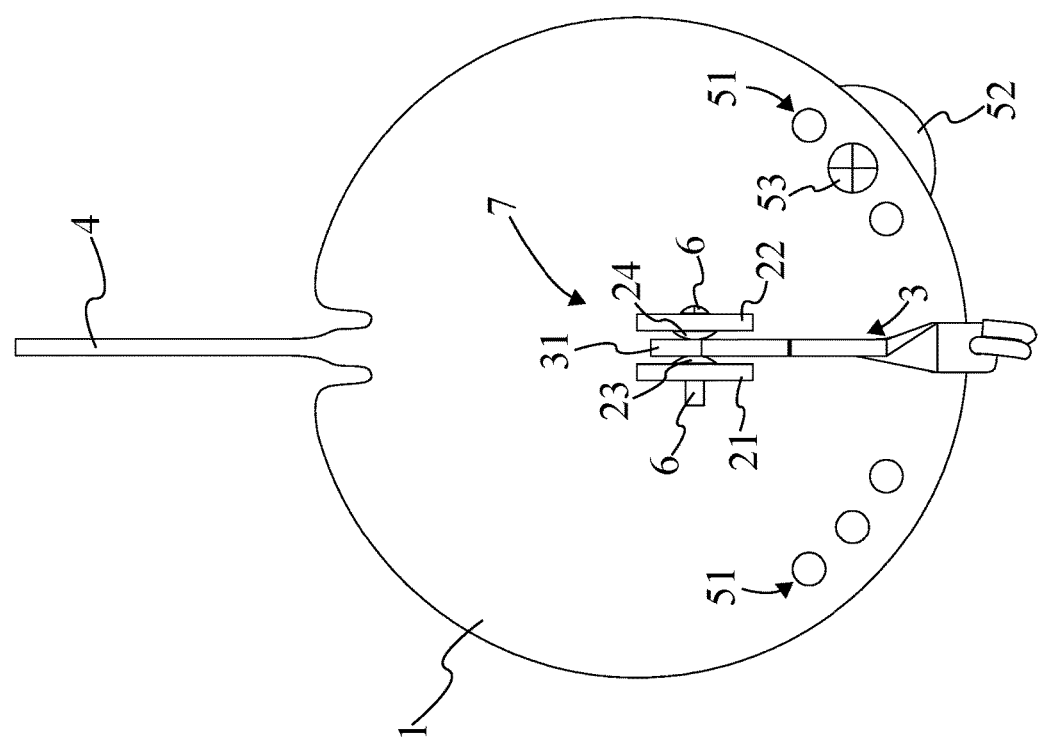
FIG. 3 is a top view thereof.

As earlier referenced, the catch assembly 2 is provided to securely engage the release arm 3. When the release arm 3 and the catch assembly 2 are in an engaged configuration 7 (as shown in FIG. 1-FIG. 3), the free end 31 of the release arm 3 is positioned between the first panel 21 and the second panel 22. The first retaining member 23 and second retaining member 24 are each positioned into the thru-hole 32. As the retaining members move freely within the latch assembly 2, the body of the diver is then free to react with the water current and water pressure against the lateral surfaces of the body and the outboard fin 4. With a leader line and lure attached to the outboard fin 4, the resulting movements of the body 1 provide a more realistic movement of said lure.

Figure 4:
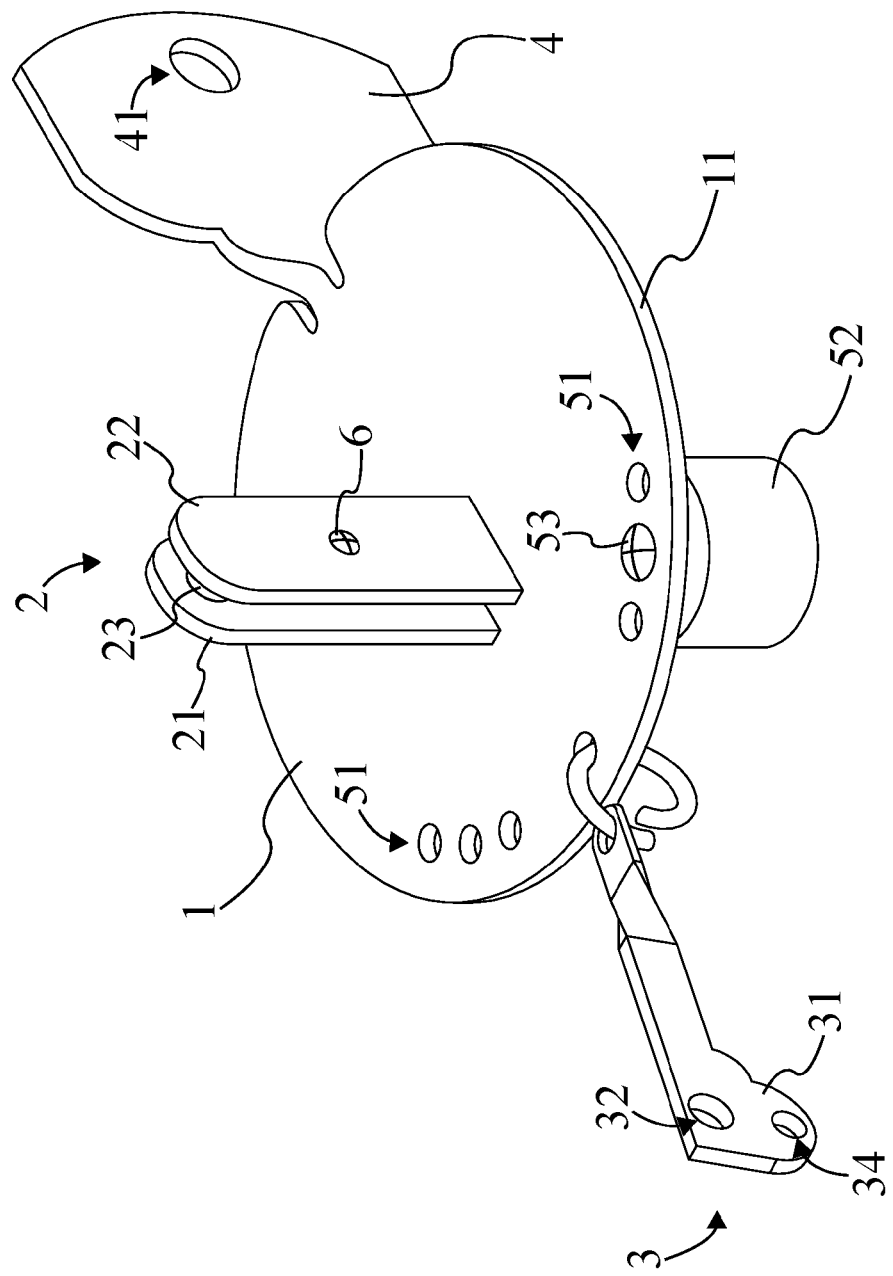
FIG. 4 is a perspective view showing the present invention with the release arm released from the catch/body assembly.
Figure 5:
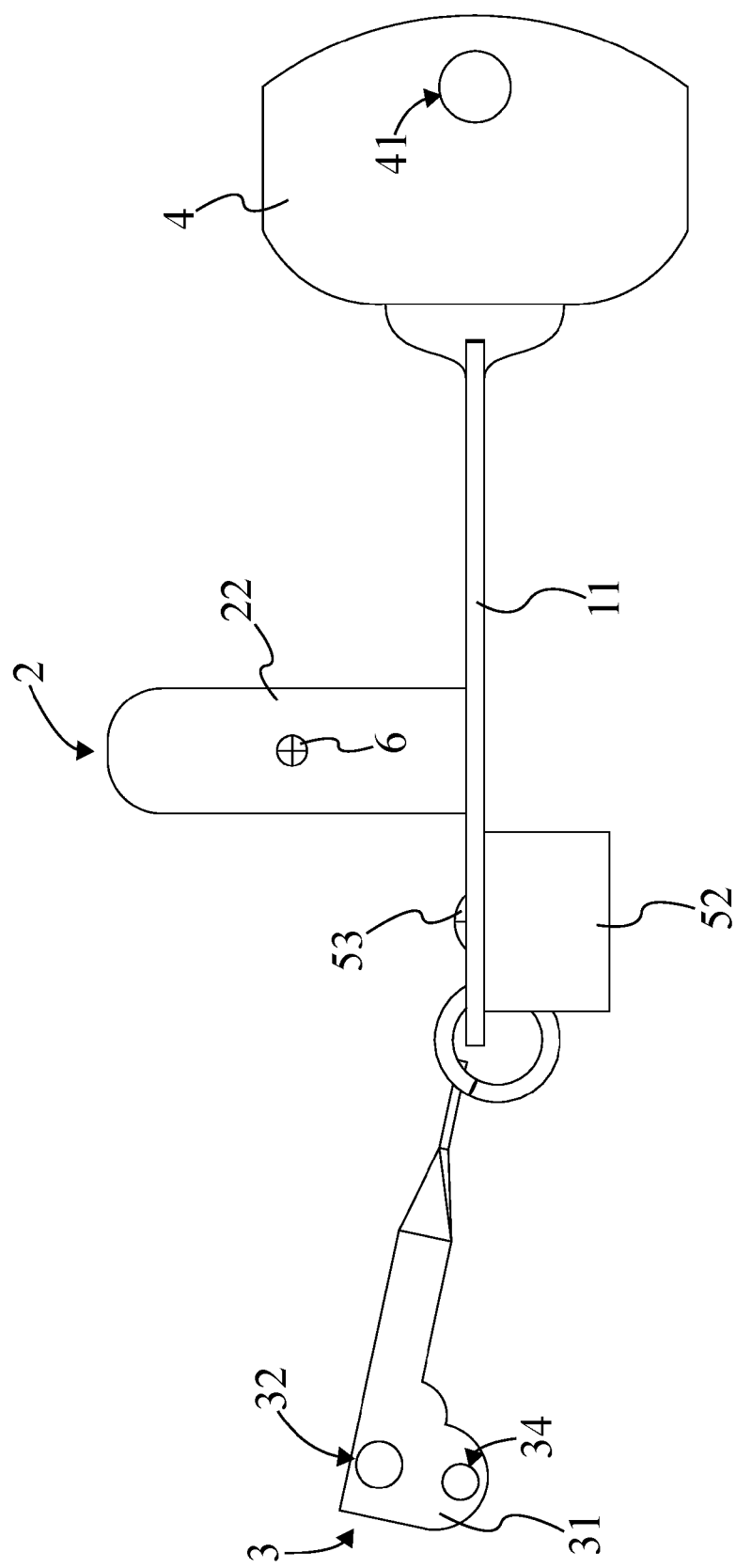
FIG. 5 is a side view thereof.
Figure 6:
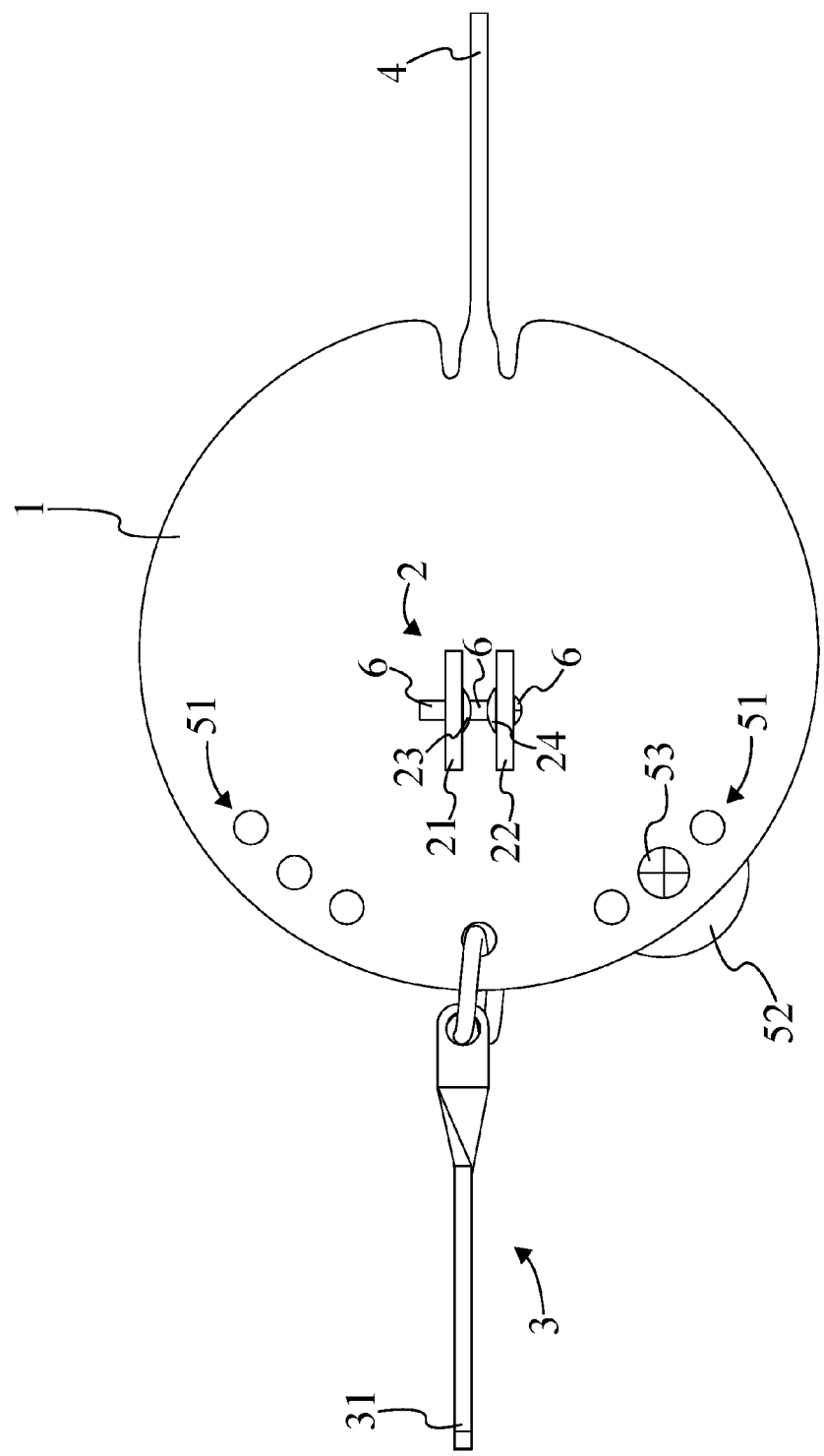
FIG. 6 is a top view thereof.

When a fish bites a joined lure and triggers the release arm 3, the release arm 3 and the catch assembly 2 switch to a disengaged configuration. In this disengaged configuration, the release arm 3 and plate 1, are aligned to release all water pressure to plate 1, allowing for uninhibited retrieval via fishing line reel 2. An example of this configuration is shown in FIG. 4-FIG. 6.

The present invention can be secured to a boat's line via the release arm 3. To support this, the present invention comprises a line coupling 34. The line coupling 34 is a hole positioned at a terminal end of the release arm 3. More specifically, the line coupling 34 is positioned at free end 31 of the release arm 3. The line coupling 34 traverses through the release arm 3 to create the hole within the release arm 3. This hole allows a line to be secured to the release arm 3.

To secure the lure, as previously referenced throughout this document, the present invention comprises a lure coupling 41. The lure coupling 41 is positioned at the end of the fin 4, where the lure coupling 41 traverses through the fin 4. The lure coupling 41 thus forms a hole in the fin 4, parallel to how the line coupling 34 forms a hole in the release arm 3. A lure is then secured to the present invention via the lure coupling 41.

The above components and configurations result in a trolling diver that creates realistic movement and a smooth release of the release arm 3 and a connected lure. A description of operation of the present invention is subsequently provided to further illustrate the derived benefits. The steps described below do not have to be performed sequentially; for example, a user might choose to connect a weight 52 before securing the release arm 3 within the catch assembly 2, but could just as easily perform these steps in the opposite order.

To begin setup of the present invention, a user must connect a fishing reel line to the release arm 3 and move the release arm 3 to the engaged configuration 7 with the catch assembly 2. To secure the release arm 3 and the catch assembly 2 in the engaged configuration 7, a user rotates the free end 31 of the release arm 3 into the catch assembly 2, i.e. between the first panel 21 and the second panel 22. As the free end 31 is rotated between the two panels, the first retaining member 23 and second retaining member 24 each snap into the thru-hole 32. Reiterating a core concept of the present invention, the engagement between each retaining member and the catch assembly 2 is loose. That is, the retaining members, body 1, and fin 4 are able to jiggle and flop around while engaged to the catch assembly 2. The movements within the body 1 and fin 4 in turn allows for a more realistic lure movement while still securing the release arm 3 to the catch assembly 2.

If a user desires to create a tighter or looser fit between the release arm 3 and the catch assembly 2, they can simply manipulate the tension-adjusting member 6. For example, provided the tension-adjusting member 6 is a screw as shown in the illustrated embodiment, clockwise rotation of the tension-adjusting member 6 brings the first panel 21 and the second panel 22 closer to each other. This results in a less space between the two panels, which in turn allows for less movement of the release arm 3 within the catch assembly 2.

Conversely, to create a looser connection, a user rotates the tension-adjusting member 6 in a counter-clockwise direction. Doing so moves the first panel 21 and the second panel 22 away from each other, increasing the space between the two panels. The increased space allows for more movement of the release arm 3 within the catch assembly 2.

Thus, a user is able to use the tension-adjusting member 6 as described above to adjust the play of the release arm 3 within the catch assembly 2. A user can also adjust the tilt of the present invention, accomplished by moving a weight 52 relative to the plate.

As previously described, the weight 52 itself is secured to the plate by a fastener 53. The weight 52 can be aligned with one of several holes in order to adjust the direction and amount of tilt. To couple the weight 52 with the plate 1, a user simply places the weight 52 next to a selected alignment hole 54 and then inserts the fastener 53 to hold the weight 52 in the desired position. Depending on the selected alignment hole 54, the weight can impart a mild, moderate, or significant tilt to the port or starboard side. The illustrated embodiment shows a total of six alignments holes 51, three each for the port and starboard sides. However, in other embodiments the specific number, positioning, and arrangement of the alignment holes 51 may be altered while still allowing for tilting of the present invention.

After making adjustments to tilt and play via the weight 52 and tension-adjusting member 6, a user can connect a line to the line coupling 34 at the release arm 3. The line can then be run from a boat, with the present invention being pulled at a depth and length corresponding to the amount of line used. For example, 2:1 (two feet of line for every one foot of depth) or 3:1 (three feet of line for every one foot of depth) line out ratios may be used.

Once setup as described above, the present invention can be towed behind a boat, acting as a diving lure for fish. A lure connected to fin 4 moves realistically thanks to the play between the release arm 3 and the catch assembly 2, increasing the effectiveness of the lure. When a fish strikes, the release arm 3 is triggered and released from the catch assembly 2. Said release is smooth and continuous, stemming in part from a preferred stainless steel construction and in part from the outboard fin 4 configuration. Thus, from the initial setup to a fish biting the lure, the present invention serves as an effective diving lure.

As previously stated, a stainless steel construction is preferable for the present invention. The reason for this is reduced weight and thickness of the plate, as compared to more typical materials such as plastic. The stainless steel construction also results in the present invention being strong and durable, and thus suited for use in both freshwater and salt water trolling. The reduced weight also facilitates easy retrieval of the present invention. The present invention affords several further benefits, stated below. The size and coloration of the present invention can be varied to help with trolling at different depths (through use of smaller or larger versions) and make organization (via color coding) of the present invention easier. The weight 52 is a positive lock, and can be adjusted to enable multiple port and starboard trolling positions. Several line types are compatible with the present invention, including but not limited to mono, thin wire line, and super braided lines. The present invention does not require use of a snubber; instead, poles can be used to act as snubber type actions to control accidental releases without adding more friction underwater.

The present invention is compatible with numerous depths and fish types; a smaller sized version can be used at depths as shallow as 5 feet and are effective down to 25 feet. Larger versions can be used down to 100+ feet deep, depending on the outside diameter of the device. With the largest ones being suited for the deepest trolling. Of course, more sizes of the present invention can be produced to provide increased flexibility with regards to ideal diving depths and fish types. The present invention allows users to cover a broad area, on either side of a boat at multiple depths. Multiple lines can simultaneously be run off the boat.

A further advantage of the present invention is the ease with which a user can manually disengage the release arm 3 from the catch assembly 2. This "manual release" allows the release arm 3 to be disengaged without a fish strike; instead, a user can initiate the release with a quick pull on the line, creating the necessary force to disengage the release arm 3 from the catch assembly 2. This manual release is quick, simple, and easy. Resultantly, a user is able to easily disengage the release arm 3 and pull in the present invention. This manual release is much more effective compared to those of existing trolling divers.

The present invention is shown having a pre-stamped sticker on a top surface of the plate 1; however, this feature can be omitted or altered in different embodiments of the present invention. The sticker does not significantly impact operation and functionality of the present invention.

Although the invention has been explained in relation to its preferred embodiment, it is to be understood that many other possible modifications and variations can be made without departing from the spirit and scope of the invention as hereinafter claimed.

What is claimed is:

1. A trolling diver comprises:
a plate;
a catch assembly;
a release arm;
a fin;
a line coupling;
a lure coupling;
a plurality of alignment holes;
a weight;
a fastener;
a tension-adjusting member;
the plate comprises a lateral surface;
the catch assembly comprises a first panel, a second panel, a first retaining member, and a second retaining member;
the release arm comprises a free end and a thru-hole; the release arm being hingedly connected to the plate;
the first panel and the second panel being positioned adjacent to each other, across the plate;
the first panel and the second panel being parallel with each other;
the first panel and the second panel each being connected adjacent to the plate;
the first retaining member being mounted to the first panel;
the first retaining member being a convex protrusion;
the second retaining member being mounted to the second panel;
the second retaining member being a convex protrusion;
the first retaining member and the second retaining member each being positioned between the first panel and the second panel;
the thru-hole traversing through the free end;
the fin being positioned opposite the release arm and extending from the lateral surface;
the fin being connected to the plate;
the fin being configured to increase leverage, to decrease fish-striking force, and to mimic realistic lure movement;
the line coupling traversing through the free end of the release arm;
the lure coupling traversing through the fin;
the lure coupling and the line coupling being oriented parallel to each other;
the weight being a positive lock;
the plurality of alignment holes being positioned in the plate opposite the fin;
the plurality of alignment holes being positioned adjacent to and along the lateral surface;
the plurality of alignment holes traversing through the plate;
the weight being positioned adjacent to a selected alignment hole of the plurality of alignment holes;
the fastener traversing through the selected alignment hole into the weight;
the tension-adjusting member laterally traversing through the first panel and the second panel;
the tension-adjusting member being threadibly engaged with the first panel and the second panel;
the tension-adjusting member being positioned adjacent to the plate;
wherein when the release arm and the catch assembly are in an engaged configuration, the free end being positioned between the first panel and the second panel, the first retaining member being positioned into the thru-hole, and
the second retaining member being positioned into the thru-hole.

2. The trolling diver as claimed in claim 1 comprises:
the plate being made of stainless steel;
the catch assembly being made of stainless steel;
the release arm being made of stainless steel;
the fin being made of stainless steel;
the catch assembly being resistant to shape changes due to water temperature changes; and
the release arm being resistant to shape changes due to water temperature changes.

* * * * *